US012801290B2

(12) United States Patent
Lee et al.

(10) Patent No.: US 12,801,290 B2
(45) Date of Patent: Nov. 17, 2026

(54) MEMORY DEVICE, OPERATING METHOD OF MEMORY DEVICE, AND STORAGE DEVICE INCLUDING MEMORY DEVICE

(71) Applicant: SK hynix Inc., Gyeonggi-do (KR)

(72) Inventors: Hyun Jun Lee, Gyeonggi-do (KR); Ji Wong Ko, Gyeonggi-do (KR); Jun Ha Hwang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 49 days.

(21) Appl. No.: 18/762,652

(22) Filed: Jul. 3, 2024

(65) Prior Publication Data

US 2025/0238147 A1 Jul. 24, 2025

(30) Foreign Application Priority Data

Jan. 18, 2024 (KR) ........................ 10-2024-0007984

(51) Int. Cl.
*G06F 3/06* (2006.01)
*G06F 5/06* (2006.01)

(52) U.S. Cl.
CPC .......... *G06F 3/0619* (2013.01); *G06F 3/0656* (2013.01); *G06F 5/06* (2013.01)

(58) Field of Classification Search
CPC ......... G06F 3/0619; G06F 3/0656; G06F 5/06
See application file for complete search history.

(56) References Cited

U.S. PATENT DOCUMENTS

| | | | | |
|---|---|---|---|---|
| 4,300,173 A * | 11/1981 | Harris | G11B 20/1419 | |
| 4,860,193 A * | 8/1989 | Bentley | G06F 5/12 | 710/55 |
| 5,570,040 A * | 10/1996 | Lytle | H03K 19/17736 | 365/189.08 |
| 5,572,148 A * | 11/1996 | Lytle | H03K 19/17704 | 365/230.02 |
| 5,978,868 A * | 11/1999 | Maas | G06F 5/10 | 710/52 |
| 6,049,223 A * | 4/2000 | Lytle | H03K 19/17736 | 326/38 |
| 6,092,128 A * | 7/2000 | Maas | H04L 49/9047 | 365/221 |
| 6,456,628 B1 * | 9/2002 | Greim | G06F 12/0284 | 711/E12.013 |
| 7,228,509 B1 * | 6/2007 | Dada | G06F 30/327 | 716/108 |
| 7,948,872 B2 * | 5/2011 | Patel | H04L 49/901 | 370/217 |
| 9,916,105 B1 * | 3/2018 | Asnaashari | G11C 7/20 | |
| 2005/0018514 A1 * | 1/2005 | Knaack | G06F 5/06 | 365/221 |

(Continued)

FOREIGN PATENT DOCUMENTS

KR 1019970004510 A 1/1997

*Primary Examiner* — Joseph D Torres
(74) *Attorney, Agent, or Firm* — IP & T GROUP LLP

(57) ABSTRACT

A memory device includes a cell region and a peripheral region including a buffer region. The cell region comprises a plurality of memory cells. The peripheral region receives data to be stored in the cell region and a clock signal to which the data is synchronized, and resets the buffer region in which the data is stored when it is determined that an under-run has occurred based on a count value of the clock signal.

15 Claims, 5 Drawing Sheets

(56) References Cited

U.S. PATENT DOCUMENTS

| | | | | |
|---|---|---|---|---|
| 2009/0129172 | A1* | 5/2009 | Kim | G11C 7/02<br>365/189.05 |
| 2011/0119569 | A1* | 5/2011 | Lee | G11C 16/22<br>711/E12.001 |
| 2019/0237123 | A1 | 8/2019 | Mori et al. | |
| 2023/0393754 | A1* | 12/2023 | Johnson | G06F 11/0772 |

* cited by examiner

MEMORY DEVICE, OPERATING METHOD OF MEMORY DEVICE, AND STORAGE DEVICE INCLUDING MEMORY DEVICE

CROSS-REFERENCES TO RELATED APPLICATION

The present application claims priority under 35 U.S.C. § 119(a) to Korean Patent application number 10-2024-0007984 filed on Jan. 18, 2024, which is incorporated herein by reference in its entirety.

BACKGROUND

1. Technical Field

Various embodiments of the present disclosure generally relate to a memory device.

2. Related Art

Electronic devices include many electronic components. For example, a computer system may include many electronic components composed of semiconductors. Semiconductor devices constituting a computer system can include processors, memory controllers, semiconductor memory devices, and the like. A semiconductor memory device may include a plurality of memory cells, which may be specified by word lines and bit lines, to store data.

As communication technology advances, a signal (or data) transmission rate between a semiconductor memory device and a controller is rapidly increasing, and under-run (or data under-run) may occur during data transmission. If the under-run is not detected and incomplete data is stored as is, the data may not be recoverable later.

SUMMARY

In an embodiment of the present disclosure, a memory device may include a cell region and a peripheral region including a buffer region. The cell region may comprise a plurality of memory cells. The peripheral region may be configured to receive data to be stored in the cell region and a clock signal to which the data is synchronized, and may be configured to reset the buffer region in which the data is stored when it is determined that an under-run has occurred based on a count value of the clock signal.

In an embodiment of the present disclosure, an operating method of a memory device may include: receiving, from a controller, data synchronized to a clock signal; counting the clock signal; determining, based on a count value of the clock signal, whether an under-run has occurred; and resetting a buffer region in which the data is stored when it is determined that the under-run has occurred.

In an embodiment of the present disclosure, a storage device may include a memory device and a controller. The memory device may be configured to detect an occurrence of an under-run. The controller may be configured to transmit, to the memory device, a program command for write data, and may be configured to retransmit, to the memory device, the program command for write data based on an under-run status value received from the memory device.

DETAILED DESCRIPTION

Various embodiments of the present disclosure are directed to providing a memory device capable of detecting an occurrence of an under-run to prevent a decrease in data reliability, a method of operating the memory device, and a storage device including the memory device.

Hereinafter, embodiments of the present disclosure will be described in more detail with reference to the accompanying drawings.

Figure 1:
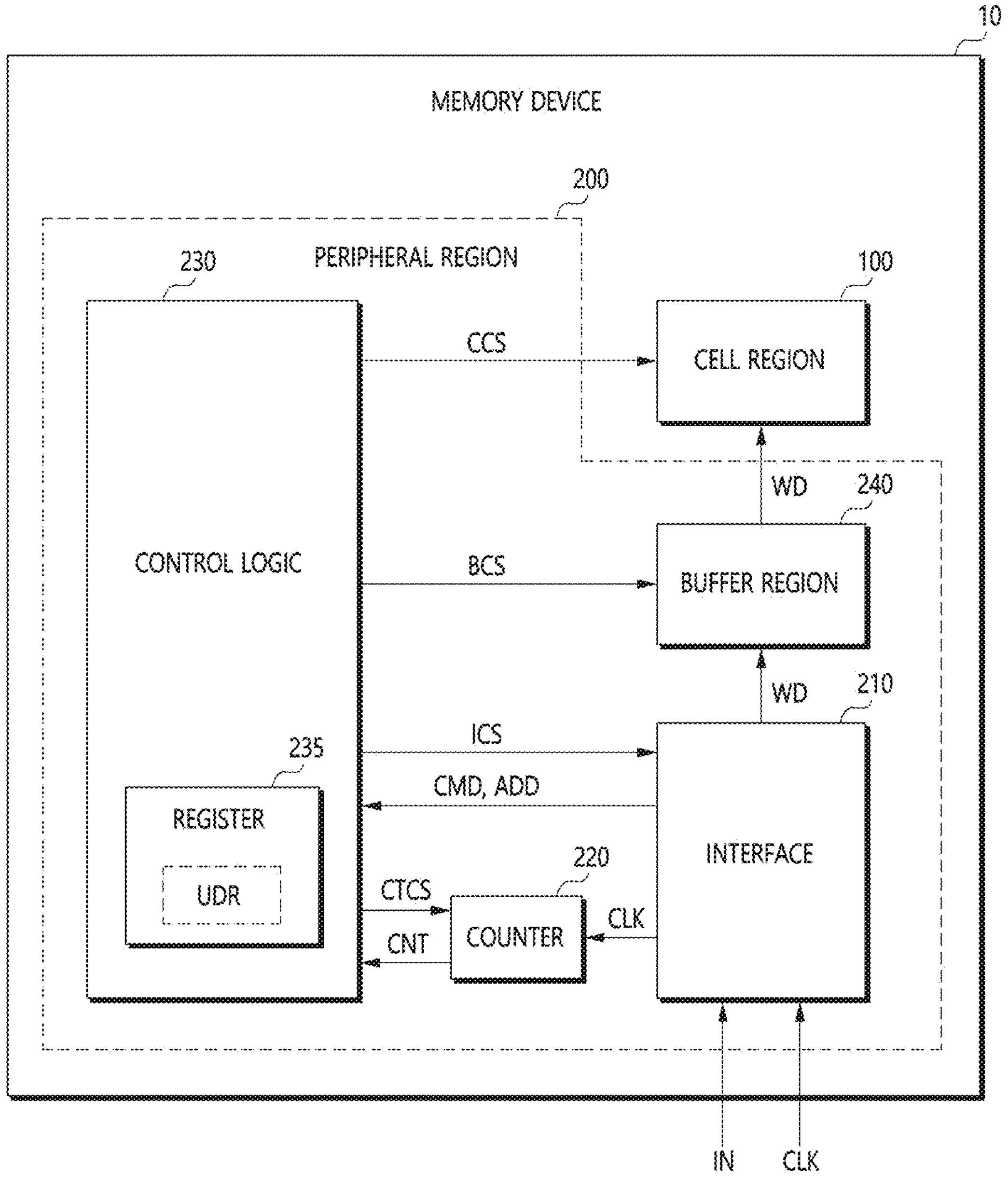
FIG. 1 is a block diagram illustrating a memory device according to an embodiment of the present disclosure.

FIG. 1 is a block diagram illustrating a memory device 10 according to an embodiment of the present disclosure.

Referring to FIG. 1, the memory device 10 may receive an input signal IN and a clock signal CLK from an external controller. The input signal IN may include commands CMD, addresses ADD, write data WD, and the like. The write data WD as the input signal IN may be synchronized to the clock signal CLK and received from the controller. The memory device 10 may perform various internal operations in response to commands CMD transmitted as the input signal IN.

The memory device 10 may include various types of memory such as NAND Flash Memory, 3D NAND Flash Memory, NOR Flash memory, Resistive Random Access Memory (RRAM), Phase-Change Memory (PRAM), Magnetic Resistive Memory (MRAM), Ferroelectric Random Access Memory (FRAM), or Spin Transfer Torque Random Access Memory (STT-RAM).

The memory device 10 may include a cell region 100 and a peripheral region 200.

The cell region 100 may include a plurality of memory cells in which the write data WD is stored. The cell region 100 may store the write data WD transmitted from a buffer region 240 in response to a cell region control signal CCS received from a control logic 230.

Each memory cell included in the cell region 100 may be categorized as a single level cell (SLC) or an extra level cell (XLC) based on the number of bits of data stored in each memory cell. Here, an XLC may be a Multi-Level Cell (MLC) that stores two bits of data, a Triple Level Cell (TLC) that stores three bits of data, a Quad Level Cell (QLC) that stores four bits of data, and so on.

The peripheral region 200 may perform program operations to store the write data WD in the cell region 100. Further, the peripheral region 200 may perform read operations to read data from the cell region 100.

The peripheral region 200 may include an interface 210, a counter 220, the control logic 230, and the buffer region 240. Each of the interface 210, the counter 220, the control logic 230, and the buffer region 240 may comprise hardware, software, firmware, or a combination thereof, such as circuits, sensors, memories, or the like.

The interface 210 may operate in response to an interface control signal ICS received from the control logic 230. The interface 210 may receive the input signal IN and the clock signal CLK transmitted from the controller. The interface 210 may receive the write data WD as the input signal IN in response to the clock signal CLK, and may transmit the write data WD to the buffer region 240. The interface 210 may transmit, to the control logic 230, the commands CMD and addresses ADD as the input signal IN. The interface 210 may transmit the clock signal CLK to the counter 220.

The counter 220 may operate in response to a counter control signal CTCS received from the control logic 230. The counter 220 may count the clock signal CLK received from the interface 210. Depending on embodiments, the counter 220 may count only rising edges, only falling edges, or both the rising edges and the falling edges of the clock signal CLK.

According to an embodiment, the counter 220 may transmit a count value CNT to the control logic 230 each time the count value CNT increases while receiving the clock signal CLK. The count value CNT may be stored in a register 235 of the control logic 230, and may be updated in the register 235.

According to an embodiment, the counter 220 may include a register (not shown) that may store the count value CNT of the clock signal CLK. The count value CNT stored within the counter 220 may be transmitted to the control logic 230 under control of the control logic 230.

The control logic 230 may perform internal operations by controlling other components of the memory device 10 in response to commands CMD communicated from the interface 210. The control logic 230 may include the register 235 that can store commands CMDs and addresses ADD, communicated from the interface 210, count value CNT communicated from the counter 220, and the like.

The control logic 230 may generate the cell region control signal CCS, and may control the cell region 100 through the cell region control signal CCS. The cell region control signal CCS may include various operating voltages (e.g., program voltage, read voltage, erase voltage, verification voltage, etc.) required in program operation, read operation, and erase operation. Although not shown, the control logic 230 may include voltage generation circuits configured to generate the various operating voltages.

In addition, the control logic 230 may generate the interface control signal ICS, and may control the interface 210 through the interface control signal ICS.

Further, the control logic 230 may generate the counter control signal CTCS and may control the counter 220 through the counter control signal CTCS. The counter control signal CTCS may include a counter activation signal for activating the counter 220.

In accordance with an embodiment, the control logic 230 may activate the counter 220 in response to a predetermined command CMD communicated from the interface 210. The predetermined command CMD to activate the counter 220 may include a program command. In accordance with an embodiment, the control logic 230 may not activate the counter 220 if it receives a command CMD other than the program command.

In accordance with an embodiment, the control logic 230 may determine whether an under-run has occurred based on the count value CNT of the clock signal CLK stored in the register 235 in response to a check command from the interface 210. An under-run may mean a situation in which the memory device 10 does not properly receive the final few toggles of the clock signal CLK transmitted from the controller and the write data WD synchronized to the clock signal CLK.

In accordance with an embodiment, the control logic 230 may determine that an under-run has occurred when the count value CNT is less than a reference value. The control logic 230 may determine that an under-run has not occurred when the count value CNT is not less than the reference value.

The reference value may correspond to a data size of the write data WD transmitted from the controller. For example, when the write data WD is transmitted and received in DDR mode and the counter 220 counts both rising edges and falling edges of the clock signal CLK, the reference value may be 4K if the write data WD is 4 kilobytes (KB). For example, when the write data WD is transmitted and received in DDR mode and the counter 220 counts rising edges of the clock signal CLK, the reference value may be 2K if the write data WD is 4 KB.

In accordance with an embodiment, the control logic 230 may select the reference value to compare to the count value CNT among a plurality of reference values based on a type of program command (i.e., a program command that instructs a program operation for the write data WD) corresponding to the write data WD. The plurality of reference values may be predetermined as values corresponding to data sizes of the write data WD for which the program operation is likely to be performed.

For example, if the program operation may be performed on a 16 KB SLC memory region comprising SLCs, a 32 KB MLC memory region comprising MLCs, and a 48 KB TLC memory region comprising TLCs, the plurality of reference values may be values corresponding to 16 KB, 32 KB, and 48 KB, respectively. Thus, if the program command is an SLC program command that instructs 16 KB of the write data WD to be stored in the SLC memory region, the control logic 230 may select the reference value corresponding to 16 KB among the plurality of reference values. In this way, the control logic 230 can accurately determine when an under-run occurs by selecting an appropriate reference value based on a type of a program command.

In accordance with an embodiment, the controller may inform the memory device 10 of the data size of the write data WD through the program command. The control logic 230 may check the data size included in the program command and determine the reference value based on the data size. According to an embodiment, the reference value may be included in the program command, and the control logic 230 may determine the reference value included in the program command. In this way, when the data size or the reference value is provided by the controller, the memory device 10 can more accurately determine an occurrence of an under-run.

In accordance with an embodiment, the control logic 230 may determine that an under-run has occurred when the count value CNT is not equal to any of the plurality of reference values. The control logic 230 may determine that an under-run has not occurred when the count value CNT is equal to any one of the plurality of reference values. The plurality of reference values may be values corresponding to data sizes of the write data WD for which the program operation may be performed. The control logic 230 may efficiently determine that an under-run has occurred by comparing the count value CNT to each of the plurality of reference values, regardless of a type of the program operation.

The control logic 230 may stop the program operation on the write data WD when it is determined that an under-run has occurred. The control logic 230 may reset (or initialize) the buffer region 240 where the write data WD is stored when it is determined that an under-run has occurred. That is, the write data WD received in the under-run situation is not complete, and the control logic 230 may reset the buffer region 240 to receive the write data WD again. When the buffer region 240 is reset, the write data WD stored in the buffer region 240 may be deleted.

In accordance with an embodiment, the control logic 230 may maintain the address ADD stored in the register 235 without resetting it even if it is determined that an under-run has occurred. When it is determined that an under-run has occurred, the controller may retransmit, to the memory device 10, the program command and the write data WD to control the program operation for the write data WD again, but may not retransmit the address ADD to the memory device 10. The determination of the controller whether an under-run has occurred is described below. In this case, the control logic 230 may receive the transmitted program command and the write data WD from the controller again and reuse the address ADD maintained in the register 235 to perform the program operation. Thus, re-performance of the program operation due to an under-run can be performed more quickly because the transmission of the address ADD to the memory device 10 is omitted.

According to an embodiment, the control logic 230 may store an under-run status value UDR in the register 235 as a predetermined fail value when it is determined that an under-run has occurred. When the control logic 230 determines that an under-run has not occurred, the control logic 230 may store the under-run status value UDR in the register 235 as a predetermined pass value.

In accordance with an embodiment, the control logic 230 may output the under-run status value UDR stored in the register 235 to the controller through the interface 210 in response to a status check command from the controller received through the interface 210.

In accordance with an embodiment, the under-run status value UDR may be stored in a register (not shown) included in the interface 210. The control logic 230 may determine the under-run status value UDR of a pass value or a fail value and transmit it to the interface 210 to store in the interface 210. The interface 210 may output, to the controller, the internally stored under-run status value UDR directly in response to the status check command from the controller.

In accordance with an embodiment, the control logic 230 may check a current temperature before receiving the write data WD and activate the counter 220 when the current temperature falls within an abnormal temperature range. The control logic 230 may not activate the counter 220 when the current temperature is not within the abnormal temperature range. Although not shown, the control logic 230 may include a temperature detection circuit capable of detecting a temperature inside the memory device 10. Thus, the control logic 230 may only detect an under-run in environments where the under-run is more likely to occur, thus avoiding unnecessary overhead. According to an embodiment, the temperature detection circuit may be located inside the peripheral region 200 rather than inside the control logic 230.

Further, the control logic 230 may generate a buffer region control signal BCS and control the buffer region 240 through the buffer region control signal BCS. The buffer region control signal BCS may include a buffer region reset signal for resetting the write data WD stored in the buffer region 240.

The buffer region 240 may operate in response to the buffer region control signal BCS received from the control logic 230. The buffer region 240 may receive, from the interface 210, write data WD to be stored in the cell region 100, and may store the write data WD before the write data WD is stored in the cell region 100. The buffer region 240 may delete the stored write data WD in response to the buffer region reset signal of the buffer region control signal BCS transmitted from the control logic 230.

According to embodiments of the present disclosure, the memory device 10 can effectively detect an occurrence of an under-run, thereby preventing a situation in which write data is stored in the cell region 100 in an uncorrectable state due to an under-run and preventing a decrease in data reliability.

Figure 2:
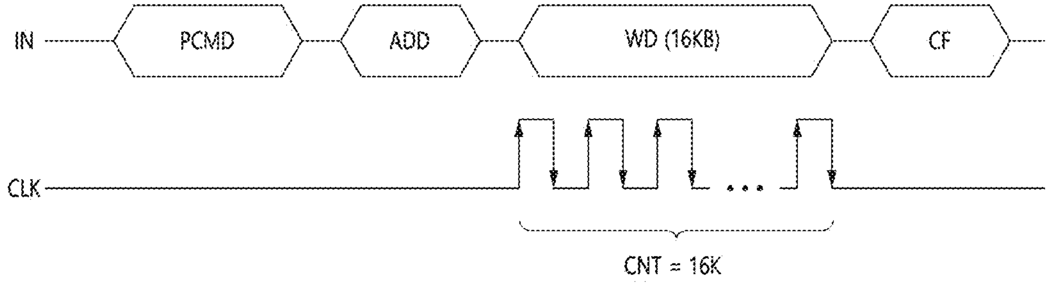
FIG. 2 is a timing diagram to illustrate how the memory device of FIG. 1 determines an under-run occurrence according to an embodiment of the present disclosure.

FIG. 2 is a timing diagram to illustrate how the memory device 10 of FIG. 1 determines an under-run occurrence according to an embodiment of the present disclosure.

Referring to FIG. 2, the input signal IN received from the controller may include a program command PCMD, addresses ADD, write data WD, and a check command CF. The program command PCMD may include a command CMD that instructs the memory device 10 to store, in the cell region 100, the write data WD into memory cells corresponding to the addresses ADD. The check command CF may include a command CMD indicating that the transmission of the write data WD has been completed. The write data WD may be transmitted synchronized to the clock signal CLK. The interface 210 may pass, to the control logic 230, the program command PCMD, the addresses ADD, and the check command CF each time they are received. The interface 210 may then pass the write data WD to the buffer region 240 and the clock signal CLK to the counter 220.

The counter 220 may count the clock signal CLK. For example, when 16 KB of write data WD is transmitted in DDR mode and the counter 220 counts both rising edges and falling edges of the clock signal CLK, the count value CNT of the clock signal CLK should be 16K if no under-run occurs, i.e., the memory device 10 is under normal circumstances. However, if an under-run occurs in the same operation, the count value CNT of the clock signal CLK will be less than 16K. Therefore, the control logic 230 may determine whether an under-run has occurred by comparing, to a reference value 16K, the count value CNT of the clock signal CLK.

Figure 3:
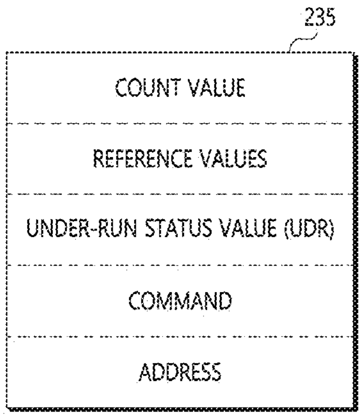
FIG. 3 is a diagram illustrating information stored in the register of FIG. 1 according to an embodiment of the present disclosure.

FIG. 3 is a diagram illustrating information stored in the register 235 of FIG. 1 according to an embodiment of the present disclosure.

Referring to FIG. 3, the register 235 may store the count value CNT received from the counter 220, reference values for comparison to the count value CNT, the under-run status value UDR determined based on the count value CNT, commands received from the interface 210, and addresses received from the interface 210.

In accordance with an embodiment, the register 235 may comprise a plurality of storage devices, each of which may store the information shown in FIG. 3.

According to an embodiment, the register 235 may be located inside the peripheral region 200 rather than inside the control logic 230.

Figure 4:
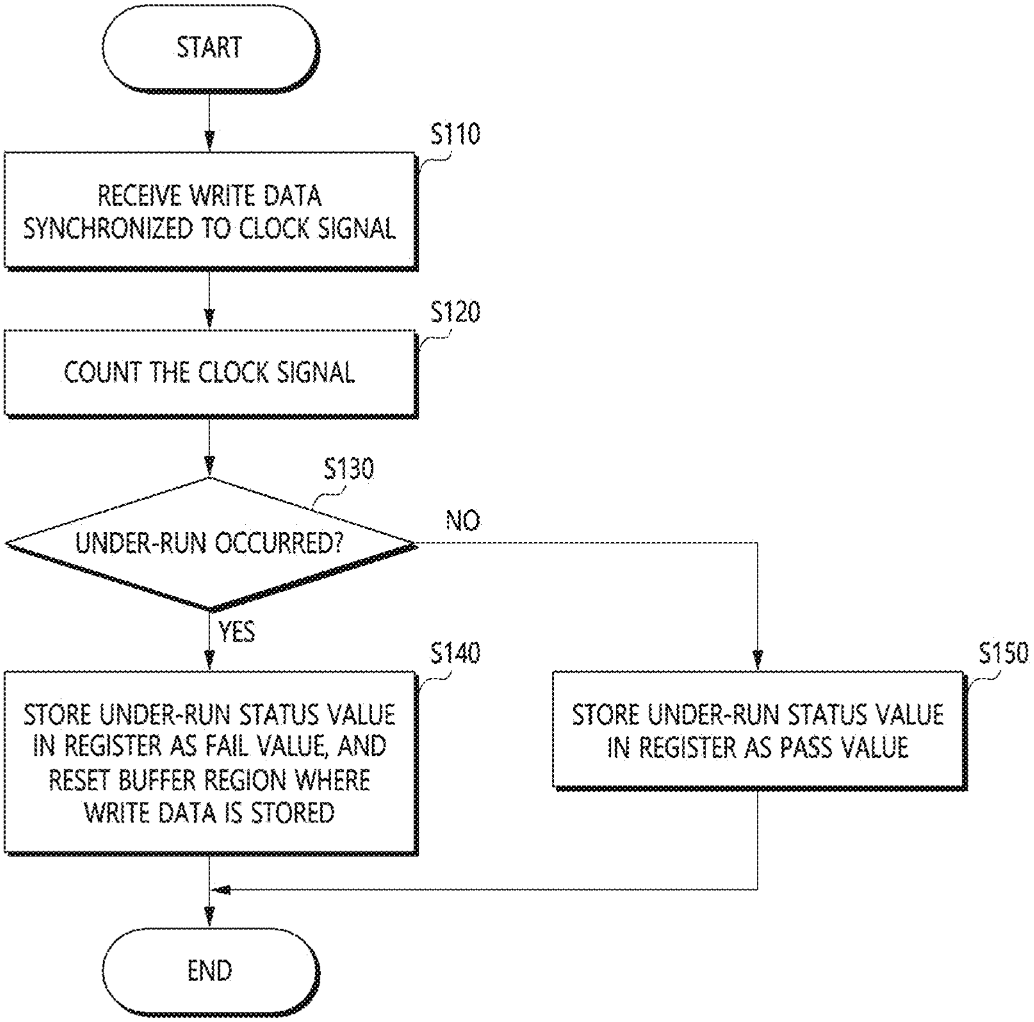
FIG. 4 is a flowchart illustrating how the memory device of FIG. 1 operates according to an embodiment of the present disclosure.

FIG. 4 is a flowchart illustrating how the memory device 10 of FIG. 1 may operate according to an embodiment of the present disclosure.

Referring to FIG. 4, in operation S110, the interface 210 may receive, from the controller, the write data WD synchronized to the clock signal CLK. The interface 210 may pass the write data WD to the buffer region 240 and pass the clock signal CLK to the counter 220.

In operation S120, the counter 220 may count the clock signal CLK. According to an embodiment, the counting of the clock signal CLK may be performed in parallel with the operation in which the write data WD is transmitted to the buffer region 240.

In operation S130, the control logic 230 may determine whether an under-run has occurred based on the count value CNT of the clock signal CLK. Specifically, the control logic 230 may determine that an under-run has occurred when the count value CNT is less than the reference value. When it is determined that an under-run has occurred (S130, YES), the procedure may proceed to operation S140. When it is determined that an under-run has not occurred (S130, NO), the procedure may proceed to operation S150.

In operation S140, the control logic 230 may store the under-run status value UDR in the register 235 as a fail value and reset the buffer region 240 where the write data WD is stored. The control logic 230 may stop the program operation on the write data WD.

In operation S150, the control logic 230 may store the under-run status value UDR in the register 235 as a pass value. The control logic 230 may perform the program operation on the write data WD.

Figure 5:
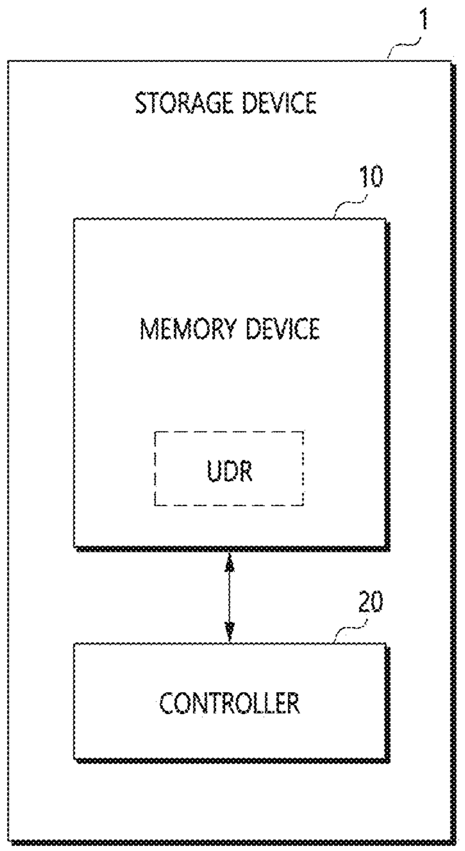
FIG. 5 is a block diagram illustrating a storage device according to an embodiment of the present disclosure.

FIG. 5 is a block diagram illustrating a storage device 1 according to an embodiment of the present disclosure.

The storage device 1 may store data received from an external host device in response to a write request from the external host device. Further, the storage device 1 may transmit the stored data to the host device in response to a read request from the host device.

The storage device 1 may include a Personal Computer Memory Card International Association (PCMCIA) card, a smart media card, a memory stick, various multi-media cards (e.g., MMC, eMMC, RS-MMC, MMC-micro), a Secure Digital (SD) card (e.g., SD, Mini-SD, Micro-SD), Universal Flash Storage (UFS), or a solid state drive (SSD).

The storage device 1 may include a memory device 10 and a controller 20. The memory device 10 may be configured and operate substantially the same as the memory device 10 of FIG. 1.

The controller 20 may control the memory device 10. For example, the controller 20 may control the memory device 10 to perform a program operation on write data in order to store the write data in the memory device 10. Specifically, the controller 20 may control the memory device 10 to perform the program operation by transmitting the program command PCMD to the memory device 10 in a sequence as shown in FIG. 2.

As described above, the controller 20 may transmit the program command PCMD to the memory device 10 that includes the data size or the reference value to allow the memory device 10 to select an appropriate reference value to determine if an under-run has occurred.

The controller 20 may check the under-run status value UDR stored in the memory device 10 by transmitting the status check command to the memory device 10. The controller 20 may control the memory device 10 to resume performing the program operation when the under-run status value UDR is a fail value. For example, the controller 20 may control the memory device 10 to resume performing the program operation by retransmitting the program command PCMD to the memory device 10 in a sequence as shown in FIG. 2.

In accordance with an embodiment, the controller 20 may change a transmission mode for the memory device 10 when the under-run status value UDR is a fail value. The changing of the transmission mode may include reducing signal (or data) transmission rate to the memory device 10, such as reducing frequency of the clock signal, bandwidth of the clock signal, or the like. After changing the transmission mode for the memory device 10, the controller 20 may control the memory device 10 to resume performing the program operation. Thus, data reliability of the memory device 10 may be ensured by reducing the signal transmission rate in an environment where the under-run occurs.

According to an embodiment, the controller 20 may increase the number of under-run occurrences each time the under-run status value UDR for each program command is a fail value. In accordance with an embodiment, the controller 20 may change the transmission mode for the memory device 10 when the number of under-run occurrences reaches a threshold value. The controller 20 may not change the transmission mode for the memory device 10 before the number of under-run occurrences reaches the threshold value.

In accordance with an embodiment, the controller 20 may not transmit an address to the memory device 10 when the controller 20 regains control of the program operation of the memory device 10 as an under-run occurs. For example, the controller 20 may transmit, to the memory device 10, the program command, the write data, and the check command when taking back control of the program operation. Even if the memory device 10 does not receive an address from the controller 20, the memory device 10 may perform the program operation based on the address it has previously received and stored in a register (e.g., the register 235 in FIG. 1).

Figure 6:
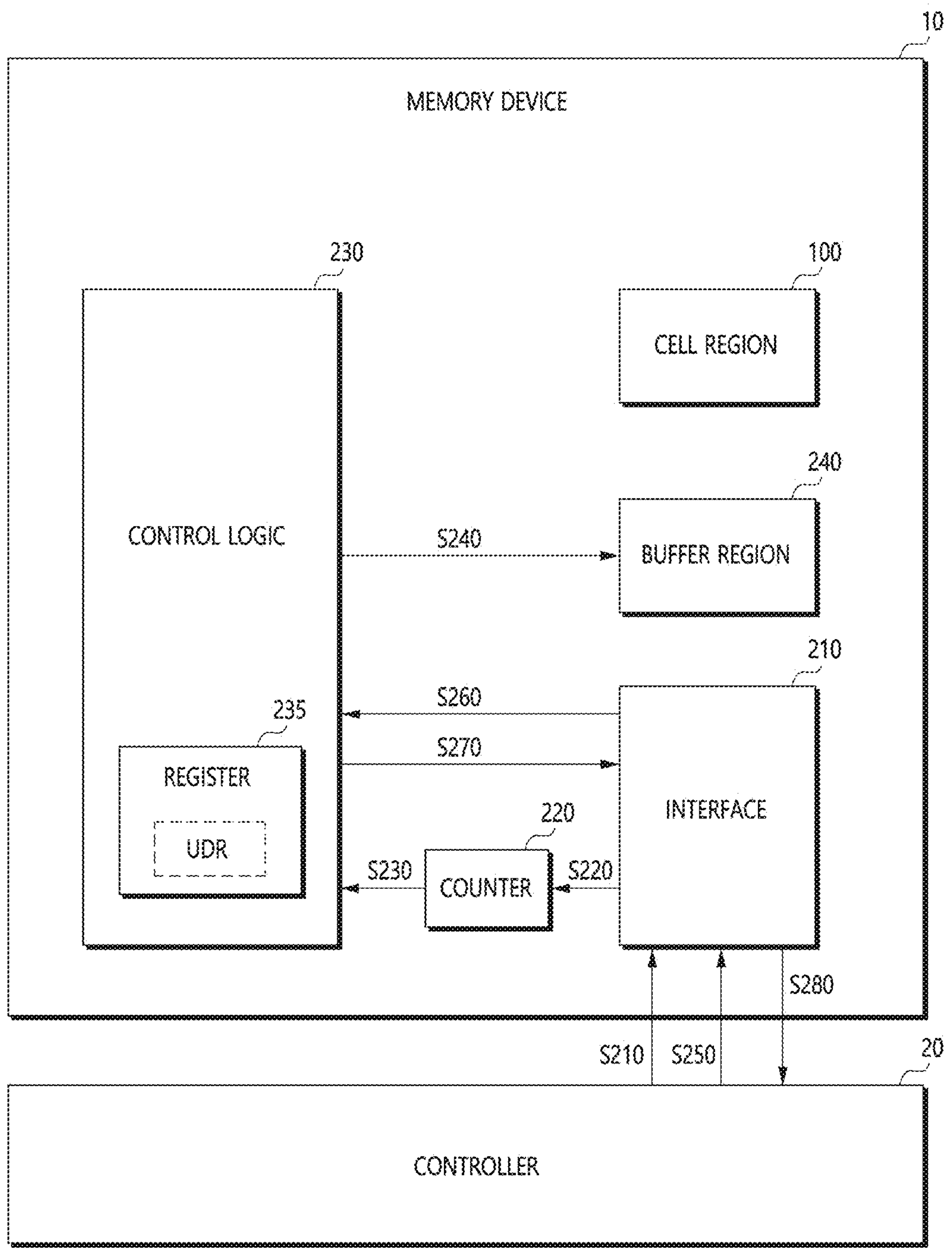
FIG. 6 is a diagram to illustrate operation of the storage device of FIG. 5 when an under-run occurs according to an embodiment of the present disclosure.

FIG. 6 is a diagram to illustrate operation of the storage device 1 of FIG. 5 when an under-run occurs according to an embodiment of the present disclosure.

Referring to FIG. 6, in operation S210, the controller 20 may transmit, to the memory device 10, the clock signal and the write data synchronized to the clock signal to allow the memory device 10 to perform the program operation. The interface 210 may receive the clock signal and the write data.

In operation S220, the interface 210 may transmit the clock signal to the counter 220. The counter 220 may count the clock signal.

In operation S230, the counter 220 may transmit, to the control logic 230, the count value of the clock signal. The control logic 230 may determine that an under-run has occurred based on the count value of the clock signal, and may store the under-run status value UDR in the register 235 as a predetermined fail value.

In operation S240, the control logic 230 may reset the buffer region 240.

In operation S250, the controller 20 may transmit the status check command to the memory device 10.

In operation S260, the interface 210 may transmit the status check command to the control logic 230.

In operation S270, the control logic 230 may transmit, to the interface 210, the under-run status value UDR of a fail value in response to the status check command.

In operation S280, the interface 210 may transmit, to the controller 20, the under-run status value UDR of a fail value. The controller 20 may control the memory device 10 to re-perform the program operation based on the under-run state value UDR of a fail value.

A person skilled in the art to which the present disclosure pertains can understand that the embodiments of the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that the meaning and scope of the claims and all changes or modified forms derived from the equivalent concept thereof are included in the scope of the present disclosure. Furthermore, the embodiments may be combined to form additional embodiments.

What is claimed is:

1. A memory device comprising:

a cell region comprising a plurality of memory cells; and a peripheral region including a buffer region, and configured to receive a program command, data to be stored in the cell region, and a clock signal to which the data is synchronized, configured to determine a reference value based on the program command, the reference value corresponding to a size of the data; and configured to reset the buffer region in which the data is stored when it is determined that an under-run has occurred by comparing a count value of the clock signal with the reference value.

2. The memory device of claim 1, wherein the peripheral region determines that the under-run has occurred when the count value is less than the reference value.

3. The memory device of claim 2, wherein the peripheral region selects the reference value among a plurality of reference values according to a type of the program command.

4. The memory device of claim 2, wherein the peripheral region checks, from the program command, information indicating the size of the data, and determines the reference value based on the size of the data.

5. The memory device of claim 1, wherein the peripheral region determines a current temperature before receiving the data, and activates a counter to count the clock signal when the current temperature falls within an abnormal temperature range.

6. The memory device of claim 1, wherein the peripheral region stores an under-run status value when it is determined that the under-run has occurred, and outputs the under-run status value to a controller in response to a status check command.

7. The memory device of claim 1, wherein the peripheral region receives, from a controller, an address corresponding to the data, and maintains the address in a register even if it is determined that the under-run has occurred.

8. The memory device of claim 7, wherein when it is determined that the under-run has occurred, the peripheral region receives the data back from the controller, and stores the data in the cell region by reusing the address maintained in the register.

9. An operating method of a memory device, the method comprising:

receiving, from a controller, a program command and data synchronized with a clock signal;

counting the clock signal;

determining, based on the program command, a reference value corresponding to a size of the data;

determining whether an under-run has occurred by comparing a count value of the clock signal with the reference value; and resetting a buffer region in which the data is stored when it is determined that the under-run has occurred.

10. The method of claim 9, wherein the determining whether the under-run has occurred includes determining that the under-run has occurred when the count value is less than the reference value.

11. The method of claim 10, wherein the determining whether the under-run has occurred further includes selecting the reference value among a plurality of reference values according to the type of the program command.

12. The method of claim 10 wherein the determining whether the under-run has occurred further includes checking, from the program command, information indicating the size of the data, and determining the reference value based on the size of the data.

13. The method of claim 9, further including:

checking a current temperature before receiving the data; and activating a counter to count the clock signal when the current temperature falls within an abnormal temperature range.

14. The method of claim 9, further including:

storing an under-run status value when it is determined that the under-run has occurred; and outputting, to the controller, the under-run status value in response to a status check command.

15. The method of claim 9, further including:

receiving, from the controller, an address corresponding to the data, wherein the address is maintained in a register even if it is determined that the under-run has occurred.

* * * * *